(12) United States Patent
Cleve

(10) Patent No.: US 9,219,958 B2
(45) Date of Patent: Dec. 22, 2015

(54) SYSTEMS AND METHODS FOR ACOUSTIC ECHO CANCELLATION WITH WIRELESS MICROPHONES AND SPEAKERS

(75) Inventor: Pascal Cleve, Sudbury, MA (US)

(73) Assignee: Revo Labs, Inc, Sudbury, MA (US)

( * ) Notice: Subject to any disclaimer, the term of this patent is extended or adjusted under 35 U.S.C. 154(b) by 272 days.

(21) Appl. No.: 13/909,494

(22) PCT Filed: Feb. 22, 2012

(86) PCT No.: PCT/US2012/026147
§ 371 (c)(1),
(2), (4) Date: Jul. 10, 2013

(87) PCT Pub. No.: WO2012/116083
PCT Pub. Date: Aug. 30, 2012

(65) Prior Publication Data
US 2013/0322639 A1    Dec. 5, 2013

Related U.S. Application Data

(60) Provisional application No. 61/445,348, filed on Feb. 22, 2011.

(51) Int. Cl.
*H04M 9/08* (2006.01)
*H04R 3/00* (2006.01)
*H04R 3/02* (2006.01)
*H04M 3/00* (2006.01)
*H04M 3/56* (2006.01)

(52) U.S. Cl.
CPC .............. *H04R 3/002* (2013.01); *H04M 3/002* (2013.01); *H04M 3/568* (2013.01); *H04M 9/082* (2013.01); *H04R 3/02* (2013.01); *H04R 2420/07* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,699,423 | A * | 12/1997 | Yoshida | H04M 9/082 379/388.03 |
| 6,434,235 | B1 | 8/2002 | Minkoff | |
| 6,745,055 | B1 * | 6/2004 | Iyengar | H04M 1/6033 455/462 |
| 2003/0223574 | A1 * | 12/2003 | Schulz | H04M 9/082 379/406.01 |
| 2006/0193466 | A1 * | 8/2006 | Rodman | H04M 9/082 379/406.06 |
| 2010/0311471 | A1 * | 12/2010 | Herve | H04M 9/082 455/569.2 |

* cited by examiner

*Primary Examiner* — Duc Nguyen
*Assistant Examiner* — Assad Mohammed
(74) *Attorney, Agent, or Firm* — Robert Schuler

(57) ABSTRACT

Systems and methods for acoustic echo cancellation with wireless microphone and speaker systems are described herein. In one embodiment, an acoustic echo canceller is provided that can, among other things, cancel an acoustic echo component of an audio signal that is produced when an audio signal transmitted to a remote speaker on a lossy wireless link is picked up by a remote microphone and transmitted back to a base station on a lossy wireless link.

17 Claims, 2 Drawing Sheets

SYSTEMS AND METHODS FOR ACOUSTIC ECHO CANCELLATION WITH WIRELESS MICROPHONES AND SPEAKERS

FIELD

The present invention relates to acoustic echo cancellation. More particularly, the present invention relates to systems and methods for acoustic echo cancellation with wireless microphone and speaker systems.

BACKGROUND

Audio conferencing has grown in popularity. One problem commonly encountered in audio conferencing is the transmission of echoes to a far-end (remote) conference participant as the result of reverberation that occurs in a near-end (local) conferencing environment (e.g., reverberation of sound off the walls in a conference room can produce an echo heard by conference participants).

Prior art approaches to echo detection and cancellation commonly focus on comparing an input audio signal with an audio signal detected by a microphone in the conferencing environment. These approaches, however, often falter when the audio signal detected by a microphone is not exactly the same as the input signal. This can happen, for example, when the audio signal sent to a speaker in the conference environment is compressed in a manner that alters the signal. Compression techniques that alter the audio signal are commonly used, for example, in wireless audio conferencing systems to reduce the size of the signal transmitted over the air.

Accordingly, there is a need for a system and method for acoustic echo cancellation suited for use with wireless microphones and speakers, particularly where the audio signals are compressed for wireless transmission.

SUMMARY

Systems and methods for acoustic echo cancellation with wireless microphone and speaker systems are described herein. The acoustic echo canceller can, among other things, cancel an acoustic echo component that is produced when a signal transmitted to a remote speaker on a lossy wireless link is picked up by a remote microphone and transmitted back to a base station on a lossy wireless link.

In one aspect of the invention, a method for canceling an acoustic echo in an audio system is provided, the method includes compressing an acoustic signal, decompressing the compressed acoustic signal, transmitting the compressed acoustic signal from a base station to a remote speaker over a wireless link, generating a second acoustic signal from the compressed acoustic signal at the remote speaker, detecting the second acoustic signal with a remote microphone and transmitting the second acoustic signal back to the base station, and comparing the second acoustic signal to the decompressed acoustic signal to detect an acoustic echo component of the second acoustic signal.

The method can have a number of variations and modifications, all of which are considered within the scope of the invention. For example, in some embodiments, the second acoustic signal is an analog signal. In other embodiments, compressing the acoustic signal can include selectively removing one or more portions of the signal to reduce its size. This can save bandwidth for transmission over the wireless link by reducing the size of the signal.

In other embodiments, the second acoustic signal can be transmitted back to the base station from the remote microphone over a wireless link. In still other embodiments, comparing the second acoustic signal to the decompressed acoustic signal can include applying a linear transformation to the second acoustic signal. In some embodiments, the method can include canceling any detected acoustic echo component of the second acoustic signal. The linear transformation can be used to remove the acoustic echo component of the signal.

In some embodiments, the method can further include transmitting an output signal to a remote user following detection of the echo component. The remote user can receive the output signal over a variety of communication protocols, including traditional telephony, VOIP (Voice Over Internet Protocol), etc.

In still other embodiments, the method can further include measuring a gradient in the acoustic echo component detected from the second acoustic signal. Changes in the gradient can be used to determine if the signal transmitted to the remote speaker is being successfully received. In particular, in some embodiments, large or larger fluctuations in the gradient can indicate a loss of audio signal at the remote speaker.

In another aspect of the invention, an acoustic echo cancellation system is provided that includes a base unit configured to transmit a compressed audio signal over a wireless link, a remote wireless speaker configured to decompress the audio signal received from the base unit and play it over the speaker, a remote wireless microphone configured to detect the audio signal from the speaker and transmit it back to the base unit, a decompression module housed within the base unit and configured to decompress the compressed audio signal, and an acoustic echo canceller housed within the base unit and configured to compare an output audio signal from the decompression module to the audio signal transmitted from the remote wireless microphone to detect an acoustic echo component of the transmitted audio signal.

In some embodiments, the acoustic echo canceller can be configured to cancel the acoustic echo component detected in the transmitted audio signal. In some embodiments, the acoustic echo component can be canceled by applying a linear transformation to the transmitted audio signal.

In other embodiments, the remote wireless speaker can include a speaker, a digital-to-analog converter, and a decompression module configured to decompress the audio signal received from the base unit. Further, in some embodiments, the remote wireless microphone can include a microphone, an analog-to-digital converter, and a compression module configured to compress the detected audio signal prior to transmission back to the base unit.

In still other embodiments, the base unit can be configured to measure a gradient in the acoustic echo component detected from the transmitted audio signal. This gradient can be used to determine if a remote speaker is receiving a signal sent from a base unit. For example, in some embodiments, large fluctuations in the gradient can indicate a loss of audio signal at the remote wireless speaker.

In another aspect of the invention, a base unit for use in a wireless audio system is provided that includes a compression module configured to compress an input audio signal for transmission over a first wireless link, a first decompression module configured to decompress an output audio signal from the compression module, a second decompression module configured to decompress an audio signal received over a second wireless link, and an acoustic echo canceller configured to compare a first output audio signal from the first decompression module to a second output audio signal from the second decompression module to any of detect and cancel an acoustic echo component of the second output audio signal.

In some embodiments, the acoustic echo canceller can cancel any detected acoustic echo component of the second output audio signal. In some embodiments, the acoustic echo canceller can cancel the acoustic echo component by applying a linear transformation to the signal. In other embodiments, the compression module can be configured to compress the input audio signal by selectively removing one or more portions of the signal to reduce its size. In still other embodiments, the second decompression module can be configured to decompress the audio signal received over the second wireless link by applying an idempotent transformation to the signal. Such a transformation makes no subsequent alterations to a signal following the first application of the transformation.

BRIEF DESCRIPTION OF THE DRAWINGS

The aspects and embodiments of the invention described above will be more fully understood from the following detailed description taken in conjunction with the accompanying drawings, in which.

DETAILED DESCRIPTION

Figure 1:
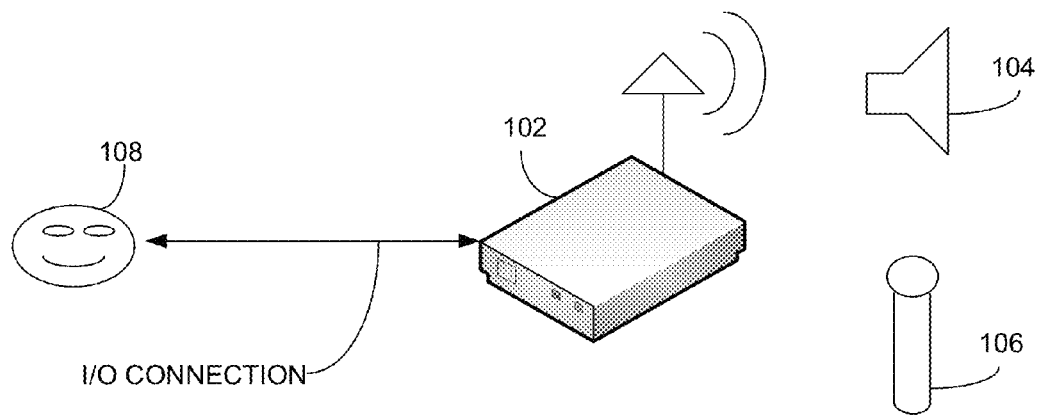
FIG. 1 is a schematic diagram of one embodiment of a wireless audio system of the present invention.

Certain exemplary embodiments will now be described to provide an overall understanding of the principles of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The terms "a" and "an" can be used interchangeably, and are equivalent to the phrase "one or more" as utilized in the present application. The terms "comprising," "having," "including," and "containing" are to be construed as open-ended terms (i.e., meaning "including, but not limited to,") unless otherwise noted. The terms "about" and "approximately" used for any numerical values or ranges indicate a suitable dimensional tolerance that allows the composition, part, or collection of elements to function for its intended purpose as described herein. These terms generally indicate a ±10% variation about a central value. Components described herein as being coupled may be directly coupled, or they may be indirectly coupled via one or more intermediate components. The recitation of any ranges of values herein is merely intended to serve as a shorthand method of referring individually to each separate value falling within the range, unless otherwise indicated herein, and each separate value is incorporated into the specification as if it were individually recited. All methods described herein can be performed in any suitable order unless otherwise indicated herein or otherwise clearly contradicted by context. The use of any and all examples, or exemplary language (e.g., "such as"), provided herein is intended merely to better illuminate the invention and does not impose a limitation on the scope of the invention unless otherwise claimed. No language in the specification should be construed as indicating any non-claimed element as essential to the practice of the invention.

The present invention generally provides systems and methods for acoustic echo cancellation that can be utilized in, for example, a base station in a wireless audio system that includes one or more wireless microphones and wireless speakers connected to the base station. An acoustic echo canceller of the present invention, can, among other things, cancel or remove an acoustic echo component produced when a signal transmitted to a remote speaker on a lossy wireless link is picked up by a remote microphone and transmitted back to the base station on a similar lossy wireless link.

The term "lossy" is used to refer to any of a number of data compression methods that result in lost data and quality with respect to an original version of a signal. Lossy compression is typically used in connection with both digital images (e.g., JPEG) and audio signals (e.g., MP3, AAC, etc.). Lossy compression involves the selective removal of data from an original signal or file to reduce the amount of data to be transferred over a link. For example, lossy compression algorithms for use with audio signals can remove portions of a signal that are inaudible, or less audible, to a human ear. Lossy compression methods can be very effective, resulting in file sizes reduced by up to 80% in some cases with little noticeable effect. As described in more detail below, however, these compression methods can also cause problems for acoustic echo cancellers and other audio signal processing components because the compressed audio signal no longer matches the original reference signal exactly.

FIG. 1 illustrates one embodiment of a wireless audio system 100 of the present invention. The wireless audio system 100 includes a base unit 102, one or more wireless speakers 104, and one or more wireless microphones 106. The base unit 102 includes one or more digital data processors or other components configured to communicate wirelessly with the one or more speakers 104 and microphones 106 that may be located throughout an environment, such as a conference room. The base unit 102 can also be connected via one or more input and/or output connections to a far-end listener 108 such that communication between the far-end listener and any users within the conference room is possible. The connection between the far-end listener and the base unit 102 can utilize any of a variety of known connection protocols, including, for example, POTS (Plain Old Telephone Service) VOIP (Voice Over Internet Protocol). Further, the wireless connection between the base unit 102 and the one or more speakers 104 and microphones 106 can utilize any of a variety of known wireless communication protocols.

Figure 2:
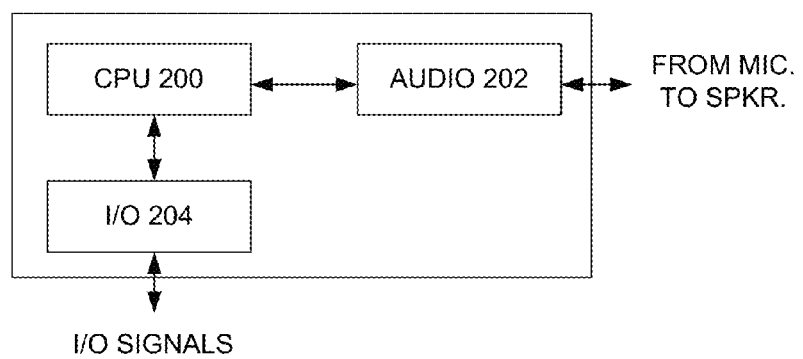
FIG. 2 is a schematic diagram of one embodiment of a base unit including an acoustic echo canceller.

The base unit 102 can also include one or more processors configured to perform audio signal processing and acoustic echo cancellation. For example, the base unit 102 can include a CPU (Central Processing Unit) 200, an audio module 202, and an I/O module 204, as illustrated in FIG. 2. Software executing on the CPU 200 can configure the CPU 200 to function as an acoustic echo canceller and perform all of the computations required to remove an acoustic echo from a signal sent to the far-end listener 108. The audio module 202 can include hardware and/or software to convert a digital audio signal into an analog signal that is compatible with a speaker. The audio module 202 can also be configured to convert an analog audio signal coming from a microphone into a digital format that can be operated on by the processor 102. Finally, the I/O module 204 can include necessary connections and electronics to connect the base unit 102 to a variety of input and output signals (e.g., telephone line connections to connect the base unit to a POTS system). One skilled in the art will appreciate that an exemplary base unit 102 can include any number of other components for additional signal processing, or may include a different configuration of one or more processors and/or modules to accomplish similar signal processing. An exemplary base unit that can be used with the methods and devices of the present invention is described in U.S. patent application Ser. No. 11/668,235 filed on Jan. 29, 2007, and entitled "Wireless Multi-User Audio System" which is hereby incorporated by reference in its entirety.

Acoustic echo is a common problem in audio systems that, similar to the exemplary audio system shown in FIG. 1, have one or more speakers and microphones at various locations in a conferencing environment. Sounds played by the one or more speakers can reverberate in the conferencing environments and can be picked up at different times by the one or more microphones. Accordingly, acoustic echo cancellers can be employed to remove the echo from the signal sent to, for example, the far-end listener 108.

Figure 3:
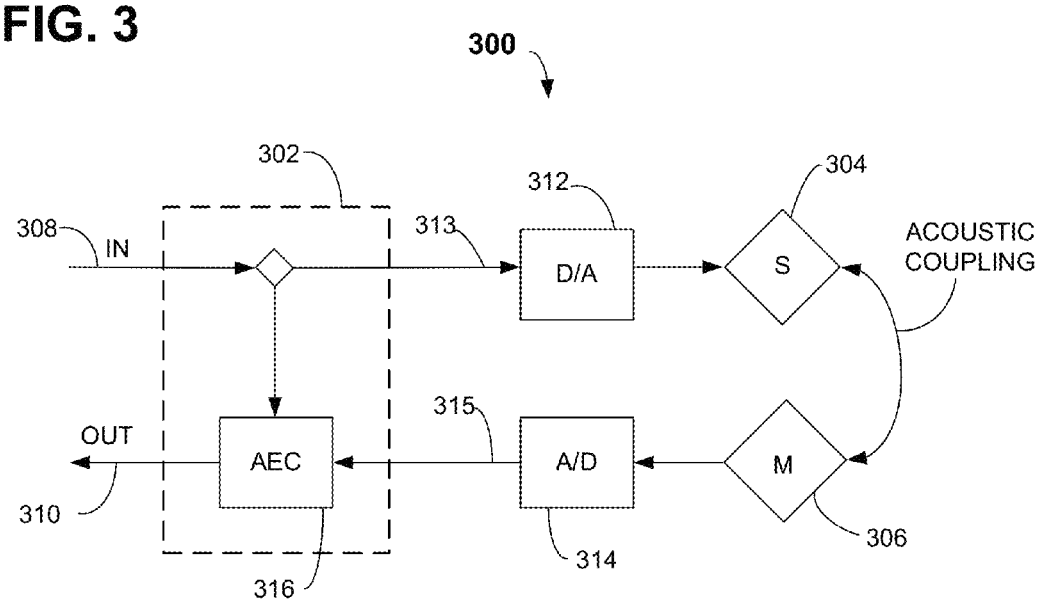
FIG. 3 is a schematic diagram of an acoustic echo cancellation system in a wired audio system.

FIG. 3 illustrates one embodiment of a wired audio system 300 that includes a base unit 302, a speaker 304, and a microphone 306. The base unit 302 can be connected to an input signal 308 and an output signal 310. These signals can, for example, be received from, and delivered to, a far-end listener 108 via a telephone, VOIP, or other communication protocol. In other embodiments, however, the signals may be connected to, for example, audio recording equipment (e.g., to record a corporate conference for regulatory compliance purposes, etc.) or any other kind of audio communication or processing apparatus.

The wired audio system 300 is a linear system, meaning that the paths followed by the incoming and outgoing signals are as linear as possible and are not altered during transmission from one component to another. For example, in the system illustrated in FIG. 3, a linear path can be traced from the input signal 308 (e.g., an audio signal received from a far-end listener) to the base unit 302. The base unit 302 can include one or more processors to operate on the signal and can deliver a digital signal to a Digital-to-Analog (D/A) converter 312 over a wired connection 313. The D/A converter 312 can convert the received digital signal into an analog signal that can be played from the speaker 304. The signal played by the speaker 304 can be picked up by the microphone 306, and an Analog-to-Digital (A/D) converter 314 can convert the analog signal into a digital signal that can be transmitted back to the base unit 302 via wired connection 315.

As described above, when the speaker 304 plays the analog signal received from the base unit 302, the sound can reverberate within the conferencing environment (e.g., conferencing room) and be picked up by the microphone 306 at one or more times following its transmission. These subsequent acoustic detections create an echo that can be heard by a far-end listener. Accordingly, the base unit 302 can include an acoustic echo canceller 316 to remove the echo. The acoustic echo canceller 316 can compare the original input signal 308 with the signal returned from the microphone 306 to detect and remove any acoustic echo before sending the output signal 310 to a far-end listener. Accordingly, the signal path from the base unit is quite linear, with signals travelling as follows: base unit, D/A conversion, speaker, room reverberation, microphone recording, A/D conversion, base unit.

In some embodiments, the echo coming back to the processor in the base unit 302 can be expressed as follows:

$$e = H(r) \quad (1)$$

where r is the signal sent to the D/A converter 312 and e is the signal returned by the A/D converter 314. H is a linear transform of the input signal r.

The above-described acoustic echo cancellation system can falter, however, when used in combination with a wireless audio system having one or more wireless speakers and microphones. One problem is that the audio signals in a wireless audio system can be sent from the base unit to one or more wireless speakers and wireless microphones over the air. Wireless audio systems typically employ a lossy compression scheme to save bandwidth by reducing the amount of audio data sent over the air, thereby improving system performance. Lossy compression schemes, however, are non-linear by nature. This is because lossy compression involves the removal of inaudible or less audible components of an audio signal, and these components can vary in location throughout a signal. The end result is that the two signals compared by an acoustic echo canceller (e.g., an original input reference signal and signal received from a microphone) can be different from each other, thereby reducing or destroying the effectiveness of the acoustic echo canceller.

Figure 4:
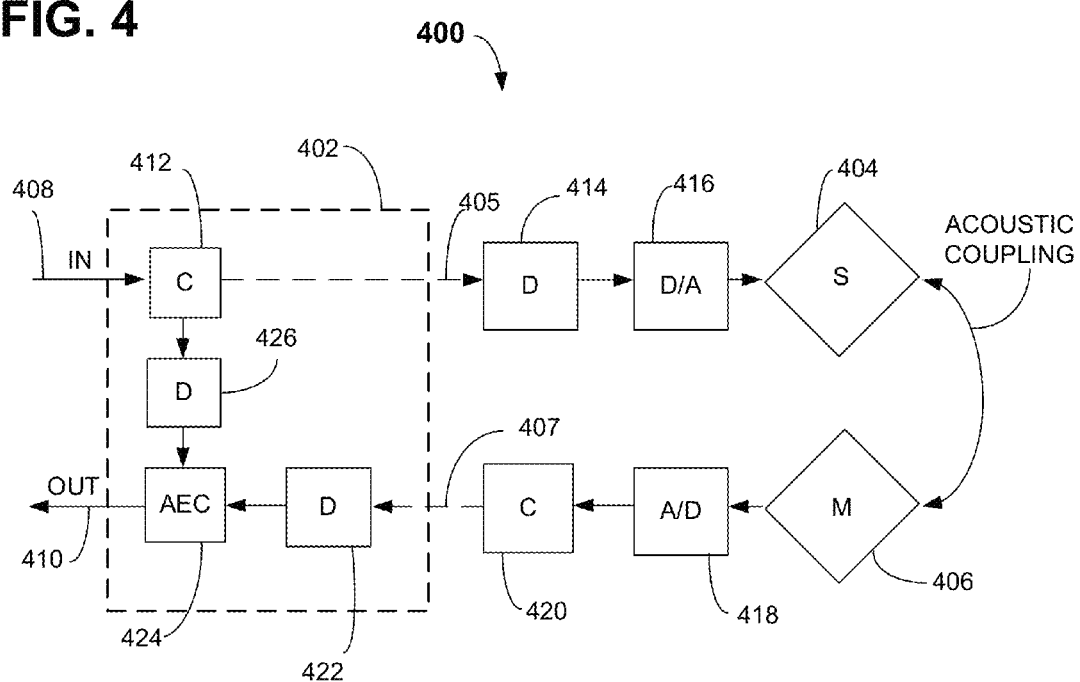
FIG. 4 is a schematic diagram of an acoustic echo cancellation system in a wireless audio system.

One embodiment of a wireless audio system 400 of the present invention is illustrated in FIG. 4. As shown in the figure, audio data can be sent from a base unit 402 to a speaker 404 over the air using a wireless connection 405. Similarly, signals recorded by a microphone 406 can also be transmitted to the base unit 402 over the air using a wireless connection 407.

The base unit 402 is connected to an input signal 408 and an output signal 410 similarly to the base unit 302 described above. However, the base unit 402 includes additional components to compress and wirelessly transmit the input signal 408 to the speaker 404. In particular, the base unit 402 includes a compression module 412 that compresses the input signal 408 using any of a variety of lossy compression methods. The compressed digital signal is then transmitted over the wireless connection 405 to the wireless speaker 404. The wireless speaker 404 includes a decompression module 414 that decompresses the digital signal before being played by the speaker. Accordingly, the audio signal returned to the base unit 402 can be mostly a linear transformation of the decompressed signal sent to the acoustic echo canceller 424 by the second decompression module 426. This allows the acoustic echo canceller to filter any echoes from the input signal 408, but send other noise, such as near-end speech, to the far-end listener without modification.

In other embodiments, systems and methods are provided to prevent the acoustic echo canceller 424 from diverging or otherwise introducing acoustic artifacts. One important aspect of minimizing divergence can be detecting any transmission errors in the wireless link between the base unit 402 and the wireless speaker 404. Transmission errors in the wireless link between the microphone 406 and the base unit 402 can be easily detected due to the obvious drop in input audio received by the base unit 402 from the microphone 406. Detecting errors in the link between the base unit 402 and the speaker 406, however, can be more difficult.

One method for detecting transmission errors is the use of an acknowledgement signal transmitted from the speaker 404 to the base unit 402. However, in a wireless and low latency system, this is not a reliable method of confirming data receipt. For example, an audio signal data packet can be received by a wireless speaker 404, but an acknowledgment signal can oftentimes be lost before reaching the base unit 402. If precautions for such an event are not taken, the acoustic echo canceller 424 can again end up processing a reference signal that is different from the signal actually played on the speaker 404. This can result in a divergence of the acoustic echo canceller 424 that can create unpleasant and undesired audio artifacts.

For example, an acoustic echo canceller can compute a linear function H' that minimizes the amount of feedback sent to a far-end listener. However, in the event of a bad data packet, e.g., blanks, the function H' can actually add echo rather than remove it. In one embodiment, this can be solved by measuring a gradient in the amount of echo being removed from a data signal (i.e., a rate of change in the amount of echo being removed). By monitoring this gradient, a determination can be made regarding the receipt of audio data by the speaker 404. For example, small variations in the value of the measured gradient can be explained by normal variations in the echo path. These can include, for example, movement of a microphone along a table or the D/A converter 416 for conversion into an analog signal that can be played by the speaker 404.

As a result of the same acoustic coupling described above between the wireless speaker and microphone, the signal played by the speaker 404 can be picked up by the wireless microphone 406 and may include one or more echo signals due to reverberations of the audio signal within the conferencing environment. An A/D converter 418 coupled to the microphone 406 can convert the recorded analog signal into a digital signal. The microphone 406 can also include a compression module 420 to compress the digital signal for transmission over the air back to the base unit 402 via wireless connection 407. The base unit 402 can include a first decompression unit 422 to decompress the signal received from the wireless microphone 406 and deliver to an acoustic echo canceller 424. Accordingly, the signal path in the audio system 400 is as follows: base unit→compression→OTA (over the air) transmission→decompression→D/A conversion→speaker→room reverberation→microphone→A/D conversion→Compression→OTA transmission→decompression→base unit.

However, the acoustic echo canceller 424 is not able to compare the original reference signal 408 and the signal received from the microphone 406 (as described with reference to FIG. 3 above) because the two signals are different. This is the result of the non-linear lossy compression and decompression that occurred when sending the input signal 408 over the air to the speaker 404. Accordingly, without particular precaution and processing, the acoustic echo canceller will process two different signals and will not converge as much as is possible.

The systems and methods of the present invention address this problem by introducing a second decompression module 426 in the base unit 402 that can replicate exactly what the decompression module 414 does when it receives the signal 408 at the wireless speaker 404. Accordingly, the two signals delivered to the acoustic echo canceller 424 can be made identical again such that the acoustic echo canceller can perform as effectively as possible.

It is worthwhile to note that the non-linearity involved in the compression and decompression of the audio signal along the path from the wireless microphone 406 to the base unit 402 does not introduce additional differences into the audio signal. This is because the compression and decompression modules 420, 422 can apply a substantially idempotent sounds associated with movement of people in the room. On the other hand, larger variations in the value of the measured gradient are likely indicative of a sudden loss of audio data.

A person skilled in the art will appreciate that the acoustic echo cancellation techniques and systems described above can be used with a variety of wireless audio systems. These include, for example, those disclosed in U.S. patent application Ser. No. 11/360,922 filed on Feb. 23, 2006, and entitled "Wireless Multi-User Audio System," U.S. patent application Ser. No. 11/563,292 filed on Nov. 27, 2006, and entitled "Wireless Multi-User Audio System," U.S. patent application Ser. No. 11/668,235 filed on Jan. 29, 2007, and entitled "Wireless Multi-User Audio System," all of which are hereby incorporated by reference in their entirety.

All papers and publications cited herein are hereby incorporated by reference in their entirety. One skilled in the art will appreciate further features and advantages of the invention based on the above-described embodiments. Accordingly, the invention is not to be limited by what has been particularly shown and described, except as indicated by the appended claims.

What is claimed is:

1. A method for canceling an acoustic echo in an audio system, comprising:
    compressing an audio signal;
    decompressing the compressed audio signal;
    transmitting the compressed audio signal from a base station to a remote speaker over a wireless link;
    generating a second audio signal from the compressed audio signal at the remote speaker;
    detecting the second audio signal with a remote microphone;
    compressing the second audio signal with an idempotent transformation and transmitting the second audio signal back to the base station; and
    decompressing, at the base station, the compressed second audio signal, the decompression being based upon the idempotent transformation;
    comparing the second audio signal to the decompressed audio signal to detect an acoustic echo component of the second audio signal; and
    cancelling any detected acoustic echo component of the decompressed second audio signal.

2. The method of claim 1, wherein the second audio signal is an analog signal.

3. The method of claim 1, wherein compressing the audio signal comprises selectively removing one or more portions of the signal to reduce its size.

4. The method of claim 1, wherein the second audio signal is transmitted back to the base station over a wireless link.

5. The method of claim 1, wherein comparing the second audio signal to the decompressed audio signal comprises applying a linear transformation to the second audio signal.

6. The method of claim 1, further comprising transmitting an output signal to a remote user following detection of the acoustic echo component.

7. The method of claim 1, further comprising measuring a gradient in the acoustic echo component detected in the second audio signal.

8. The method of claim 7, wherein large fluctuations in the gradient indicate a loss of audio signal at the remote speaker.

9. An acoustic echo cancellation system, comprising:
    a base unit configured to transmit a compressed audio signal over a wireless link and to decompress the compressed audio signal;
    a remote wireless speaker configured to decompress the audio signal received from the base unit to provide a second audio signal and play it over the speaker;

a remote wireless microphone configured to detect the second audio signal from the speaker, to compress the second audio signal with an idempotent transformation and to transmit it back to the base unit;

a decompression module housed within the base unit and configured to decompress the compressed second audio signal based on the idempotent transformation; and an acoustic echo canceller housed within the base unit and configured to compare a decompressed second audio signal to the decompressed audio signal transmitted from the remote wireless microphone to detect an acoustic echo component of the decompressed second audio signal, and to cancel any detected acoustic echo component in the decompressed second audio signal.

10. The system of claim 9, wherein the detected acoustic echo component is canceled by applying a linear transformation to the transmitted audio signal.

11. The system of claim 9, wherein the remote wireless speaker comprises a speaker, a digital-to-analog converter, and a decompression module configured to decompress the audio signal received from the base unit.

12. The system of claim 9, wherein the remote wireless microphone comprises a microphone, an analog-to-digital converter, and a compression module configured to compress the detected audio signal prior to transmission back to the base unit.

13. The system of claim 9, wherein the base unit is configured to measure a gradient in the acoustic echo component detected from the transmitted audio signal.

14. The system of claim 13, wherein large fluctuations in the gradient indicate a loss of audio signal at the remote wireless speaker.

15. A base unit for use in a wireless audio system, comprising:

a compression module configured to compress an input audio signal for transmission over a first wireless link;

a first decompression module configured to decompress an output audio signal from the compression module;

a second decompression module configured to decompress an audio signal received over a second wireless link based upon an idempotent transformation; and an acoustic echo canceller configured to compare a first output audio signal from the first decompression module to a second output audio signal from the second decompression module to detect and to cancel any detected acoustic echo component of the second output audio signal.

16. The base unit of claim 15, wherein the acoustic echo canceller cancels any detected acoustic echo component by applying a linear transformation.

17. The base unit of claim 15, wherein the compression module is configured to compress the input audio signal by selectively removing one or more portions of the signal to reduce its size.

* * * * *